United States Patent
Lee et al.

(10) Patent No.: US 9,606,353 B2
(45) Date of Patent: Mar. 28, 2017

(54) VARIABLE TRANSPARENCY GLASS AND APPARATUS FOR ADJUSTING VARIABLE TRANSPARENCY GLASS

(71) Applicant: Hyundai Motor Company, Seoul (KR)

(72) Inventors: Sung Woo Lee, Gyeonggi-Do (KR); Hoon Choi, Gyeonggi-Do (KR); Min Jae Kang, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/562,720

(22) Filed: Dec. 7, 2014

(65) Prior Publication Data

US 2016/0054631 A1    Feb. 25, 2016

(30) Foreign Application Priority Data

Aug. 19, 2014    (KR) ........................ 10-2014-0107552

(51) Int. Cl.
   *G02F 1/153*        (2006.01)
   *G02B 27/01*        (2006.01)
   *G02F 1/1334*       (2006.01)

(52) U.S. Cl.
   CPC ........... *G02B 27/01* (2013.01); *G02F 1/1334* (2013.01)

(58) Field of Classification Search
   CPC ........ G02F 1/155; G02F 1/1334; G02B 27/01
   USPC ........................... 359/245, 265–275; 345/204
   See application file for complete search history.

(56) References Cited

U.S. PATENT DOCUMENTS

| 4,146,876 | A | * | 3/1979 | Arellano | C09K 9/02 345/105 |
| 6,819,393 | B1 | * | 11/2004 | Date | G02F 1/133553 349/201 |
| 6,906,842 | B2 | * | 6/2005 | Agrawal | G02F 1/1523 359/265 |
| 8,102,586 | B2 | * | 1/2012 | Albahri | B60J 3/04 359/265 |
| 8,792,154 | B2 | * | 7/2014 | Moskowitz | E06B 9/24 345/107 |
| 2007/0153358 | A1 | * | 7/2007 | Duston | F24J 2/06 359/275 |
| 2011/0255142 | A1 | | 10/2011 | Ash et al. | |

FOREIGN PATENT DOCUMENTS

| JP | 10-329541 A | 12/1998 |
| KR | 10-2009-0073901 A | 7/2009 |
| KR | 10-2009-0097252 A | 9/2009 |
| KR | 10-2011-0030410 A | 3/2011 |
| KR | 10-2012-0013600 A | 2/2012 |
| KR | 10-2012-0090074 | 8/2012 |
| KR | 10-2013-0031769 A | 3/2013 |
| KR | 10-2013-0064486 A | 6/2013 |

(Continued)

*Primary Examiner* — Tuyen Tra
(74) *Attorney, Agent, or Firm* — Mintz Levin Cohn Ferris Glovsky and Popeo, P.C.; Peter F. Corless

(57) ABSTRACT

A variable transparency glass and an apparatus for adjusting a transparency variable glass are provided. The transparency variable glass includes a first transparent plate that has a first electrode part formed on an inner surface thereof and a second transparent plate that has a second electrode part formed on an inner surface thereof. In addition, a variable transmission layer is disposed between the first transparent plate and the second transparent plate.

13 Claims, 7 Drawing Sheets

(56) References Cited

FOREIGN PATENT DOCUMENTS

| WO | 96/24881 A1 | 8/1996 |
| WO | 2006-130543 A2 | 12/2006 |
| WO | 2011-036420 A1 | 3/2011 |

\* cited by examiner

| | Window transmittance | Window Circuit | Note |
|---|---|---|---|
| CASE 1 (Transparent) | | ↑ ↑ ↑ ↑ liquid crystal polymer ↑ ↑ ↑ ↑ | Non-application of electric field to ITO electrode (Off = Transparent) Ex. Gray Scale = 0 $V=0$ |
| CASE 2 (Translucent) | | ⁄ ⁄ ⁄ ⁄ liquid crystal polymer ⁄ ⁄ ⁄ ⁄ | Application of electric field to ITO electrode (On = Translucent) Ex. Gray Scale = 128 $V=6$ |
| CASE 3 (Opaque) | | → → → liquid crystal polymer → → → | Application of electric field to ITO electrode (On = Opaque) Ex. Gray Scale = 256 $V=12$ |

FIG. 6

VARIABLE TRANSPARENCY GLASS AND APPARATUS FOR ADJUSTING VARIABLE TRANSPARENCY GLASS

CROSS-REFERENCE TO RELATED APPLICATION(S)

This application claims under 35 U.S.C. §119(a) the benefit of Korean Patent Application No. 10-2014-0107552 filed Aug. 19, 2014, the entire contents of which are incorporated herein by reference.

BACKGROUND

Technical Field

The present disclosure relates to a variable transparency glass and an apparatus for adjusting a variable transparency glass, and more particularly, to a variable transparency glass and an apparatus for adjusting a variable transparency glass, in which different transparencies are respectively provided to parts of the glass based on a difference between voltages input to the glass.

Background Art

The transmittance of a variable transparency switching window (VTSW) applied to front glasses, sunroofs, and the like of vehicles may be varied based on each transparency. Accordingly, an apparatus for controlling transmittance has been developed to provide a transparency based on a user selection. Generally, a variable transparency glass includes a transmission layer that is capable of changing light transmission and optical characteristics in response to power applied to power supply electrode terminals via two power supply electrodes. When the transmission layer is configured as described above, the variable transparency glass includes a transmission layer made of a liquid crystal polymer.

The variable transparency glass has been used for vehicle glasses (e.g., windshield, car windows, and the like), and thus the transparency of a glass of a vehicle can be varied based on a user selection. Moreover, when a vehicle has a head-up display, the transparency of a front glass of the vehicle (e.g., a vehicle windshield) may need to be adjusted.

However, the transparency of the glass based on the user selection may be difficult to adjust. Further, a predetermined part of the glass such as a translucent or opaque part may be difficult to form using the conventional configuration described above. In addition, when two planar electrodes are deposited on the glass, the transparency may decrease due to an increase in a thickness of the electrode.

When a transparency control glass is manufactured by forming the transmission layer into a gas structure, a density of gas may not be uniform and a separate circuit for driving the gas structure may be required. A technique for changing light transmission and optical characteristics in response to a current applied between two supply terminals in a transparent electrochromic system using a pair of supply electrodes (e.g., at least one pair of polarization electrodes) has been developed. However, in such a developed related art, the transparency may not be adjusted by adjusting power applied to the supply electrodes. Further, the transparency of a predetermined part of a glass configured to be transparent may not be adjusted.

SUMMARY

The present invention provides a technique capable of adjusting the transparency of a variable transparency glass by forming an electrode of the variable transparency glass with a plurality of sub-electrodes. In addition, the present invention provides a glass capable of adjusting the amount of power supplied from a power supply unit, and more quickly providing transparency in response to a user request, using a lookup table. Further, the present invention also provides a technique that may adjust the transparency of a desired part of glass by controlling a plurality of sub-electrodes and a power supply unit.

In one aspect, the present invention provides a variable transparency glass that may include: a first transparent plate configured to have a first electrode part formed on an inner surface thereof; a second transparent plate configured to have a second electrode part formed on an inner surface thereof; and a variable transmission layer disposed between the first and second transparent plates. In addition, the variable transmission layer may have light transmissivity (e.g., light transmitting ability) that is dependent on a change in an electric field formed between the first and second electrode parts, wherein at least one of the first and second electrode parts includes a plurality of sub-electrodes each having an individual voltage applied thereto.

In another aspect, the present invention provides an apparatus for adjusting a variable transparency glass that may include: a variable transparency glass; a power supply unit configured to provide a power source to the variable transparency glass; and a controller configured to adjust the transparency of the glass by adjusting the voltage provided to the variable transparency glass. In addition, the variable transparency glass may include: a first transparent plate that has a first electrode part formed on an inner surface thereof; a second transparent plate that has a second electrode part formed on an inner surface thereof; and a variable transmission layer disposed between the first and second transparent plates. The variable transmission layer may have light transmissivity (e.g., light transmitting ability) that is dependent on a change in an electric field formed between the first and second electrode parts, wherein at least one of the first and second electrode parts may include a plurality of sub-electrodes ach having an individual voltage applied thereto.

The present invention provides a variable transparency glass that may be adjusted based on a user request. Further, the transparency may be adjusted based on a user desired predetermined part of the glass, which may be adjusted since a plurality of sub-electrodes may be included within the first and second electrode parts. In addition, an increase in thickness of the electrode may be minimized, which may prevent a decrease in transparency. Furthermore, the transmission layer may be made of a polymer to provide a glass that has substantially uniform transparency.

Since the transparency of a predetermined part of the glass may be decreased, the focus of an image of an object reflected from the glass and the focus of the image of an object transmitted to one surface of the glass and then again reflected may correspond to each other. Accordingly, a clearer focus may be maintained when a head-up display (HUD) is provided. Further, a clearer focus may be maintained without using a separate high-priced glass for the HUD, which may increase economic efficiency. In addition, ultraviolet light and the visual field from the exterior may be blocked without perform separate tinting.

BRIEF DESCRIPTION OF THE DRAWINGS

The above and other features of the present invention will now be described in detail with reference to certain exemplary embodiments thereof illustrated the accompanying drawings which are given herein below by way of illustration only, and thus are not limitative of the present invention, and wherein:

FIG. 6 illustrates exemplary diagrams of the structure of a liquid crystal polymer of the variable transmission layer according to an exemplary embodiment of the present invention.

Figure 1:
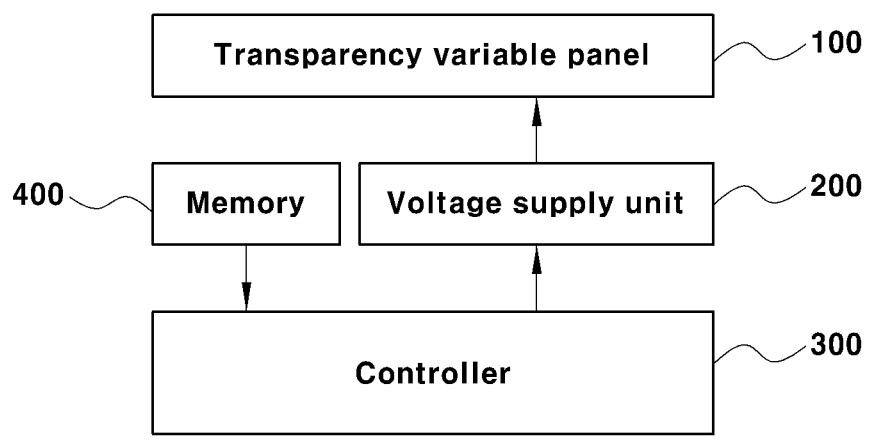
FIG. 1 is an exemplary block diagram showing an apparatus for adjusting a variable transparency glass according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

FIG. 1 is an exemplary block diagram showing an apparatus for adjusting a variable transparency glass according to an exemplary embodiment of the present invention. Referring to FIG. 1, the apparatus may include a variable transparency glass 100, a voltage supply unit 200, a controller 300 and a memory 400. The variable transparency glass 100 may form a variable transparency glass of which transparency may be adjusted based on a user selection. The variable transparency glass 100 may include a variable transmission layer of which light transmissivity (e.g., light transmitting ability) may be changed based on an electric field. Accordingly, the light transmissivity may be adjusted based on a voltage applied to electrode parts of the variable transparency glass.

The power supply unit 200 may be configured to provide a power source to the variable transparency glass 100. The power supply unit 200 may be operated by the controller 300. Accordingly, the power supply unit 200 may be configured to supply power based on data of a lookup table stored within the memory 400. Further, the power source disposed within the power supply unit 200 may be operated by the controller 300. The controller 300 may be configured to receive information regarding a transparency selected by the user and adjust a power source applied from the power supply unit 200 to the variable transparency glass 100 based on the received information. The memory 400 may be configured to store data of the lookup table and provide the data when the controller 300 adjusts the transparency. Accordingly, a response time to adjust the transparency based on the user selection may be minimized. The lookup table may store data to which voltages provided based on levels of transparency are input, and thus a rapid response speed may be provided in the adjustment of the transparency.

Figure 2:
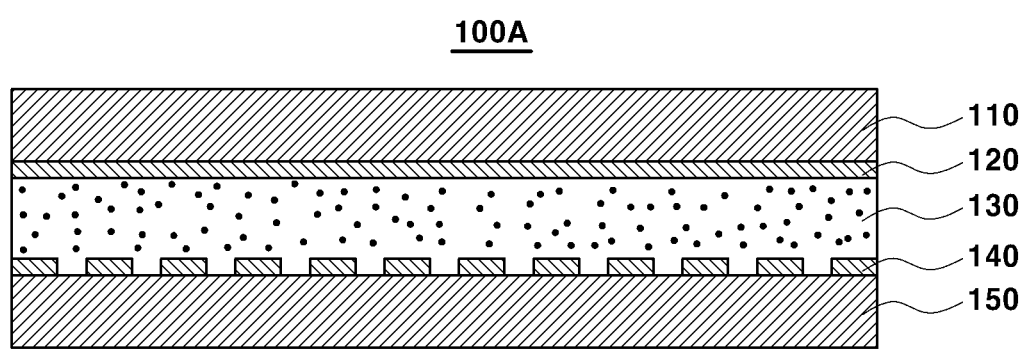
FIG. 2 is an exemplary sectional view of a variable transparency glass according to an exemplary embodiment of the present invention.
Figure 3:
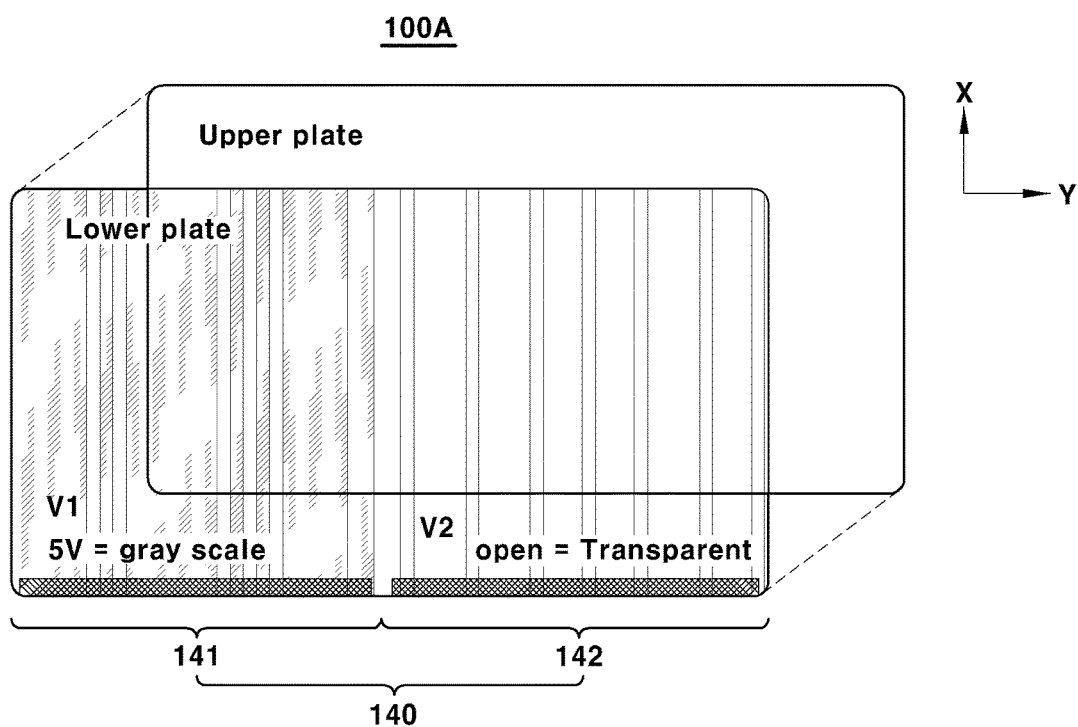
FIG. 3 is an exemplary plan view of the variable transparency glass according to an exemplary embodiment of the present invention.

FIG. 2 is an exemplary schematic sectional view of a variable transparency glass according to an exemplary embodiment of the present invention. FIG. 3 is an exemplary plan view of the variable transparency glass according to an exemplary embodiment of the present invention.

Referring to FIGS. 2 and 3, a variable transparency glass 100A may include: a plurality of transparent plates 110 and 150 and a variable transmission layer 130. The plurality of transparent plates 110 and 150 may include a first transparent plate 110 that has a first electrode part 120 formed on an inner surface thereof and a second transparent plate 150 that has a second electrode part 140 formed on an inner surface thereof.

The transparent plate may be a substrate made of an inorganic or organic material that has light transmissivity, or may be a plate formed by homogeneously or heterogeneously stacking the organic and inorganic materials. For example, the substrate may be made of at least one selected from the group consisting of: glass, quartz, polyethylene terephthalate (PET), polyethylene naphthalate (PEN), polyimide (PI), polycarbonate (PC), polystyrene (PS), polyoxymethylene (POM), acrylonitrile styrene copolymer (AS resin), triacetyl cellulose (TAC), and the like.

The first and second electrode parts 120 and 140 may be a material that has light transmissivity. For example, the first and the second electrode parts 120 and 140 may be a material selected from the group consisting of: indium tin oxide (ITO), fluorinated tin oxide (FTO), indium zinc oxide (IZO), aluminum-doped zinc oxide (AZO), zinc oxide (ZnO), and indium zinc tin oxide (IZTO). Further, when the voltage supply unit 300 applies a voltage via routing of the electrode part, the routing of the electrode part may be applied to reduce time which a voltage difference is generated along electrodes at one side (e.g., a first side). The first electrode part 120 may include a single electrode that covers the inner surface of the first transparent plate 110, and the second electrode part 140 may include a plurality of sub-electrodes on the inner surface of the second transparent plate 150. The plurality of sub-electrodes may be arranged in parallel to each other at about an equal distance.

The variable transmission layer 130, which may be positioned between the first and second transparent plates 110 and 150, may be made of a polymer that has transmissivity. In particular, the variable transmission layer 130 may be made of a liquid crystal polymer. The liquid crystal polymer may have a light transmissivity dependent on a change in electric field. Accordingly, when power is applied to the liquid crystal polymer, the light transmissivity of the liquid crystal polymer may decrease, thereby forming an opaque glass. The light transmissivity of the liquid crystal polymer may decrease when the liquid crystal polymer has a substantially high power applied thereto.

Figure 4:
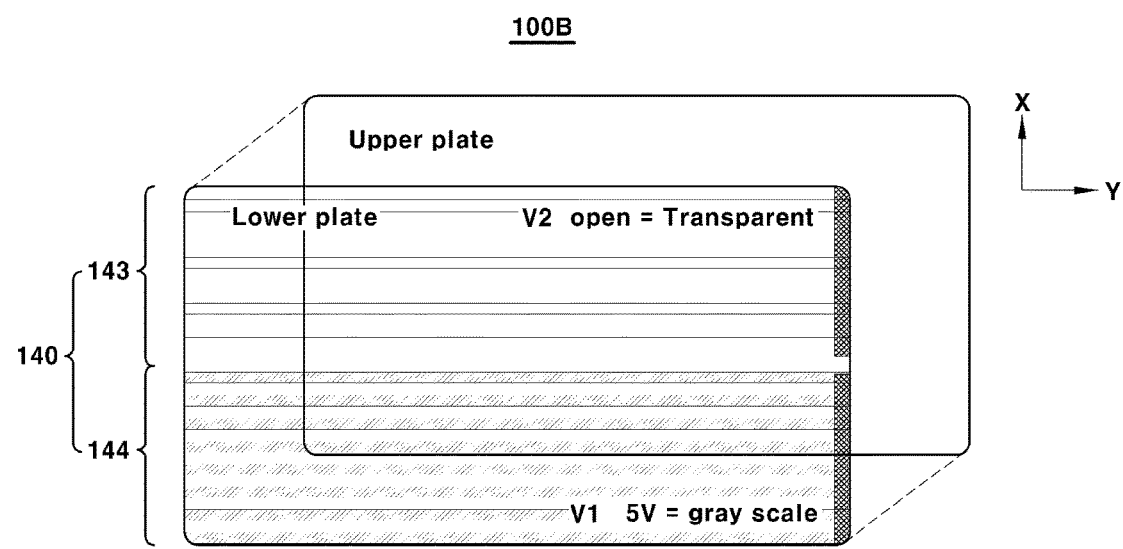
FIG. 4 is an exemplary plan view of a variable transparency glass according to an exemplary embodiment of the present invention.

FIG. 4 is an exemplary plan view of a variable transparency glass according to an exemplary embodiment of the present invention. Referring to FIG. 4, the variable transparency glass 100B may have a different configuration of the electrode part 120 compared to the variable transparency glass 100A.

Accordingly, the first electrode part 120 may include a single electrode that covers an inner surface of the first transparent plate 110. The second electrode part 140 may include a plurality of sub-electrodes on an inner surface of the second transparent plate 150. The second electrode part 140 may include a plurality of sub-electrodes that has a direction perpendicular to that of the first embodiment. The plurality of sub-electrodes may be arranged in parallel to each other at about an equal distance.

A voltage may be applied to the first and second electrode parts, which may adjust transparency of the variable transparency glass. In particular, the variable transparency glass 100 may have at least one variable area where the adjustment of independent transparency is possible. Accordingly, an individual voltage may be applied to each variable area. Further, the transparency of the variable area may be adjusted by applying a voltage to sub-electrodes overlapped with the sub-electrodes of the first and second electrode parts 120 and 140.

Figure 5:
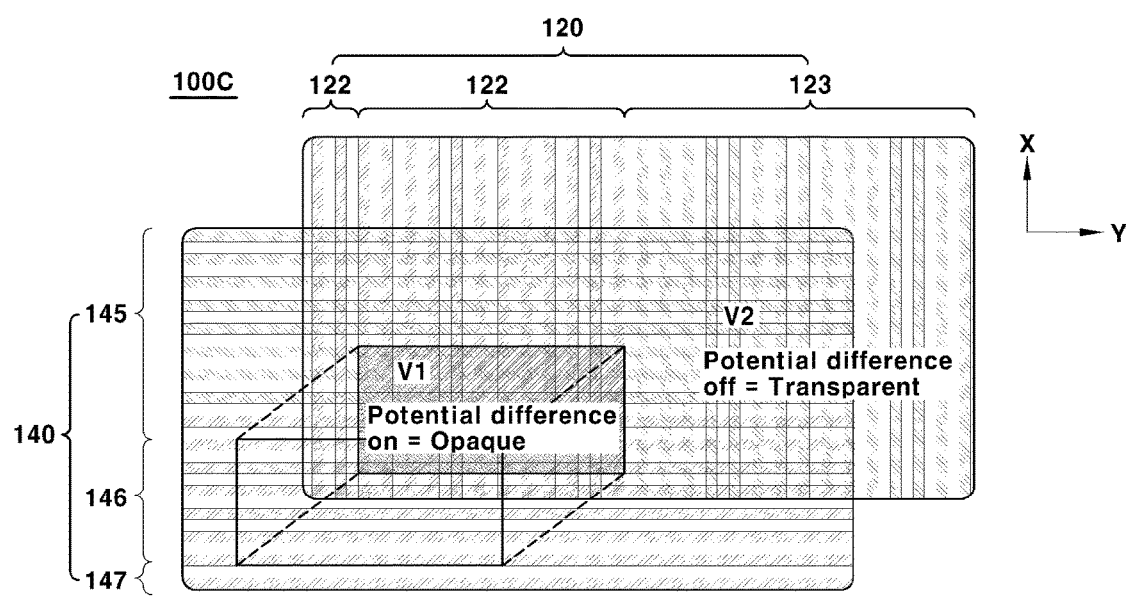
FIG. 5 is an exemplary plan view of a variable transparency glass according to an exemplary embodiment of the present invention.

FIG. 5 is an exemplary plan view of a variable transparency glass according to an exemplary embodiment.

Referring to FIG. 5, the variable transparency glass 100C may have a different configuration of the first electrode part 120 compared to the variable transparency glasses described above. Specifically, the second electrode part 120 may include a plurality of sub-electrodes arranged in parallel to each other in a first direction X. Additionally, the first electrode part 120 may include a plurality of sub-electrodes arranged in parallel to each other in a second direction Y. The plurality of sub-electrodes of the second electrode part 140 in the first direction and the plurality of sub-electrodes of the first electrode part 120 in the second direction have directions substantially perpendicular to each other at about an equal distance.

The first and second electrode parts may include a plurality of sub-electrodes. Since an individual voltage may be applied to each sub-electrode, the adjustment of independent transparency may be possible. Accordingly, the plurality of sub-electrodes may be individually connected to a component that provides a voltage source. The sub-electrodes may include terminals connected to the power supply unit 300, and the terminal may include at least one sub-electrode.

The controller 300 may include a variable transparency area that is capable of adjusting independent transparency based on a user selection. The variable transparency area may include a plurality of sub-electrodes 122 of the first electrode part 120, overlapped therewith and a plurality of sub-electrodes 146 of the second electrode part 140, overlapped therewith.

When a first variable voltage V1 is applied to the plurality of sub-electrodes 122 of the first electrode part 120, and a second variable voltage V2 is applied to the plurality of sub-electrodes 146 of the second electrode part 140, a voltage difference may be generated between sub-electrodes in a variable area, where transparency is to be adjusted. In the other areas, voltage difference may not be generated, or a voltage difference from the applied voltage may not be applied, thereby independently adjusting transparency. Accordingly, the sub-electrodes respectively connected to the terminals may have potential differences from each other.

The applied voltage, a value less than a limited supply voltage of the voltage supply unit 200, may be selectively provided. For example, a glass that represents transparencies of 256 levels may be implemented by the voltage supply unit 200 that supplies voltage of 32 levels. However, the voltage source applied from the voltage supply unit 200 is not limited thereto, and may have an alternating current (AC) or direct current (DC) form. The levels of voltages may be set using a lookup table or the like.

FIG. 6 is an exemplary diagram that illustrates the structure of a liquid crystal polymer of the variable transmission layer according to an exemplary embodiment of the present invention. The liquid crystal polymer may be a material that has light transmissive properties. However, when a voltage difference is generated in the electrode part, the liquid crystal polymer may have polarization properties. Thus, the liquid crystal polymer that has a voltage applied thereto may be configured to generate a change in phase of light transmitted thereto.

When the maximum voltage capacity of the voltage supply unit 300 is about 12 volts (V), and a voltage of about 6 V is applied to both ends of the liquid crystal polymer, the liquid crystal polymer may be configured to deflect light incident from the exterior by about 45 degrees and transmit the deflected light to the inside. When a voltage of about 12 V is applied to both the ends of the liquid crystal polymer, the light incident from the exterior may be deflected by about 90 degrees, thereby forming a glass that has opaque properties. Accordingly, the polarization performance of the liquid crystal polymer may vary based on a voltage applied to the liquid crystal polymer. Thus, the liquid crystal polymer may have different light transmissive properties based on voltages, and accordingly, the transparency of glass may be adjusted.

Figure 7:
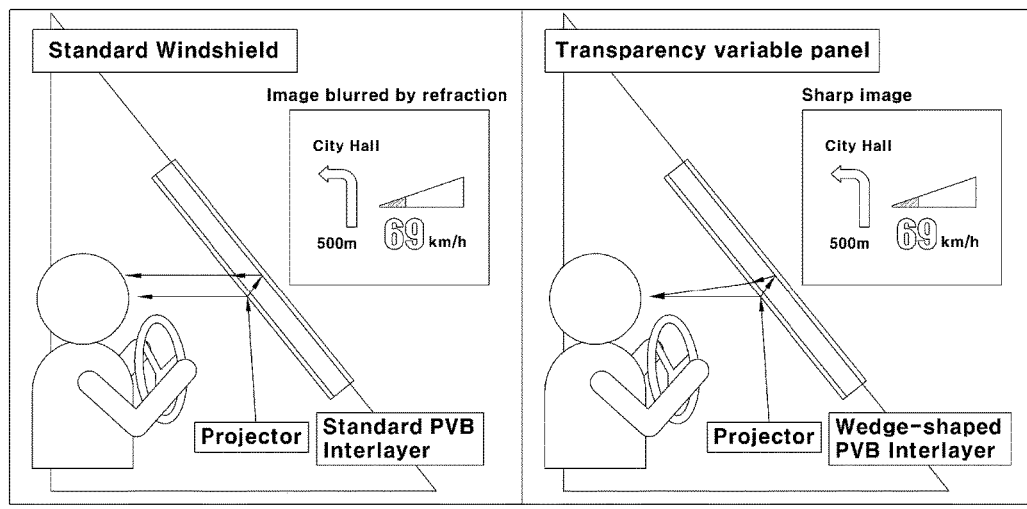
FIG. 7 is an exemplary diagram that illustrates an application of a head-up display (HUD) for controlling the focus of the image of an object, passing through the glass according to an exemplary embodiment of the present invention.

FIG. 7 is an exemplary diagram that illustrates an application of a head-up display (HUD) for controlling the focus of the image of an object, passing through the glass according to an exemplary embodiment of the present invention. When a general front glass (e.g., traditional windshield) is used, light directly reflected from the front glass and light refracted and then reflected from the front glass may not be focused, and therefore, information may not be distinctly displayed on the front glass.

When a front glass, to which the variable transparency glass of the present invention is applied, is used, a predetermined voltage may be applied to both the ends of the electrode part to have the same focus as light directly reflected from the front glass. Thus, the adjustment of a focus based on a user selection may be possible using polarization properties of the glass. When a variable transparency glass is applied to the front glass, the transparency of information area displayed on the glass may be adjusted. As a result, the visibility of the information area may increase compared to other parts of the front glass.

Additionally, the electrode part of the variable transparency as a component of the present invention may be formed into a multi-layered structure. In other words, the variable transparency glass may include a plurality of layers that each include the first and second electrode parts as one layer. In the variable transparency glass, separate third and fourth electrode parts may be overlapped with the first and second electrode parts.

A passivation layer may be laminated between the second and third electrode parts, and potential differences applied to electrode parts forming a pair vertically divided based on the passivation layer may not influence each other. Accordingly, a plurality of passivation layers may be included, so that a pair of electrode parts respectively formed on and beneath each passivation layer may be configured. Further, a plurality of electrodes may be included, thereby segmenting the overlapping electrode parts. Thus, the delicate transparency of the glass may be adjusted.

As described above, the transparency based on a user selection may be adjusted using the variable transparency glass and the apparatus of the present invention. Thus, sunlight may be blocked without separately tinting a part of the glass of the vehicle. Further, the visibility of the HUD may be increased, and the visual field from the exterior may be blocked.

Although the exemplary embodiments of the variable transparency glass and the apparatus are described as exemplary embodiments of the present invention, the technical spirit and scope of the present invention are not limited to the exemplary embodiments of the present invention. It will be understood by those skilled in the art that the configuration or form of the electrodes applied to the variable transparency glass, the technical field to which the variable transparency glass is applicable, and the configuration of the variable transparency glass are within the scope and equivalent scope of the present invention. The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A variable transparency glass, comprising:
    a first transparent plate that includes a first electrode part formed on an inner surface thereof;
    a second transparent plate that includes a second electrode part formed on an inner surface thereof;
    a variable transmission layer disposed between the first and second transparent plates and having light transmissivity that is dependent on a change in electric field formed between the first and second electrode parts,
    wherein at least one of the first and second electrode parts includes a plurality of sub-electrodes that have an individual voltage applied thereto;
    at least one variable transparency area operable for adjusting independent transparency; and
    a variable voltage that generates a voltage difference applied to sub-electrodes overlapped with the variable transparency area among the plurality of sub-electrodes,
    wherein a first variable voltage is applied to sub-electrodes of the first electrode, overlapped with the variable transparency area, and a second variable voltage is applied to sub-electrodes of the second electrode part, overlapped with the variable transparency area, to adjust transparency based on a difference between the first and second voltages.

2. The variable transparency glass of claim 1, wherein the plurality of sub-electrodes is a plurality of sub-electrodes arranged in parallel to each other at about an equal distance.

3. The variable transparency glass of claim 1, wherein
    the first electrode part includes a single electrode that covers the inner surface of the first transparent plate, and
    the second electrode part includes a plurality of sub-electrodes arranged on the inner surface of the second transparent plate.

4. The variable transparency glass of claim 1, wherein
    the first electrode part includes a plurality of sub-electrodes arranged in parallel along a first direction on the inner surface of the first transparent plate, and
    the second electrode part includes a plurality of sub-electrodes arranged in parallel along a second direction on the inner surface of the second transparent plate.

5. The variable transparency glass of claim 4, wherein the first and second directions are perpendicular to each other.

6. The variable transparency glass of claim 1, wherein the first and second electrode parts are formed of indium tin oxide.

7. The variable transparency glass of claim 1, wherein the variable transmission layer is formed of a liquid crystal polymer.

8. An apparatus for adjusting a variable transparency glass, comprising:
a variable transparency glass that includes:
a first transparent plate that includes a first electrode part formed on an inner surface thereof;
a second transparent plate that includes a second electrode part formed on an inner surface thereof; and
a variable transmission layer disposed between the first and second transparent plates and having light transmissivity dependent on a change in electric field formed between the first and second electrode parts,
a power supply operable for providing a power source to the variable transparency glass;
a controller operable for adjusting the transparency of the variable transparency glass by adjusting the voltage provided to the variable transparency glass,
wherein at least one of the first and second electrode parts includes a plurality of sub-electrodes that have an individual voltage applied thereto;
at least one variable transparency area operable for adjusting independent transparency; and
a variable voltage that generates a voltage difference applied to sub-electrodes overlapped with the variable transparency area among the plurality of sub-electrodes,
wherein, when a voltage source supplied from the power supply unit is provided to the variable transparency glass, the controller controls a variable transparency area that has an independent transparency, and
wherein a first variable voltage is applied to sub-electrodes of the first electrode, overlapped with the variable transparency area, and a second variable voltage is applied to sub-electrodes of the second electrode part, overlapped with the variable transparency area, to adjust transparency based on a difference between the first and second voltages.

9. The apparatus of claim 8, wherein the plurality of sub-electrodes is a plurality of sub-electrodes arranged in parallel at about an equal distance.

10. The apparatus of claim 8, wherein
the first electrode part includes a single electrode that covers the inner surface of the first transparent plate, and
the second electrode part includes a plurality of sub-electrodes arranged on the inner surface of the second transparent plate.

11. The apparatus of claim 8, wherein
the first electrode part includes a plurality of sub-electrodes arranged in parallel along a first direction on the inner surface of the first transparent plate, and
the second electrode part includes a plurality of sub-electrodes arranged in parallel along a second direction on the inner surface of the second transparent plate.

12. The apparatus of claim 11, wherein the first and second directions are perpendicular to each other.

13. The apparatus of claim 8, further comprising:
a memory connected to the controller and operable for providing a lookup table to the controller.

* * * * *